United States Patent [19]

Wolniak

[11] Patent Number: 4,827,658
[45] Date of Patent: May 9, 1989

[54] FISHING TACKLE BOX WITH VERTICAL STORAGE COMPARTMENTS

[76] Inventor: Robert T. Wolniak, Rte. 2, Box 221, Cornell, Wis. 54732

[21] Appl. No.: 118,539

[22] Filed: Nov. 9, 1987

[51] Int. Cl.⁴ ............................................. A01K 97/06
[52] U.S. Cl. ....................................... 43/54.1; 43/57.1
[58] Field of Search .............................. 43/54.1, 57.1; 206/315.11

[56] References Cited

U.S. PATENT DOCUMENTS

| | | | |
|---|---|---|---|
| 3,047,349 | 7/1962 | Powell | 43/54.1 |
| 3,350,810 | 11/1967 | Warner et al. | 43/57.1 |
| 3,780,468 | 12/1973 | Maffett | 43/54.1 |
| 3,897,650 | 8/1975 | Pilston | 43/54.1 |
| 4,006,553 | 2/1977 | Porter et al. | 43/54.1 |
| 4,023,304 | 5/1977 | Singer | 43/54.1 |
| 4,073,085 | 2/1978 | Stremeckus | 43/54.1 |
| 4,589,546 | 5/1986 | Sunderland | 43/57.1 |

Primary Examiner—Kurt Rowan
Attorney, Agent, or Firm—Wall and Roehrig

[57] ABSTRACT

A fishing tackle box having a plurality of vertically disposed storage compartments or tubes for containing various size fishing lures. The vertically disposed tubes are formed from transparent plastic and positioned in the tackle box with a portion thereof extending upwardly from the base portion of the tackle box to permit the lures carried within the vertically disposed storage compartments or tubes to be readily seen for facilitating lure selection.

10 Claims, 1 Drawing Sheet

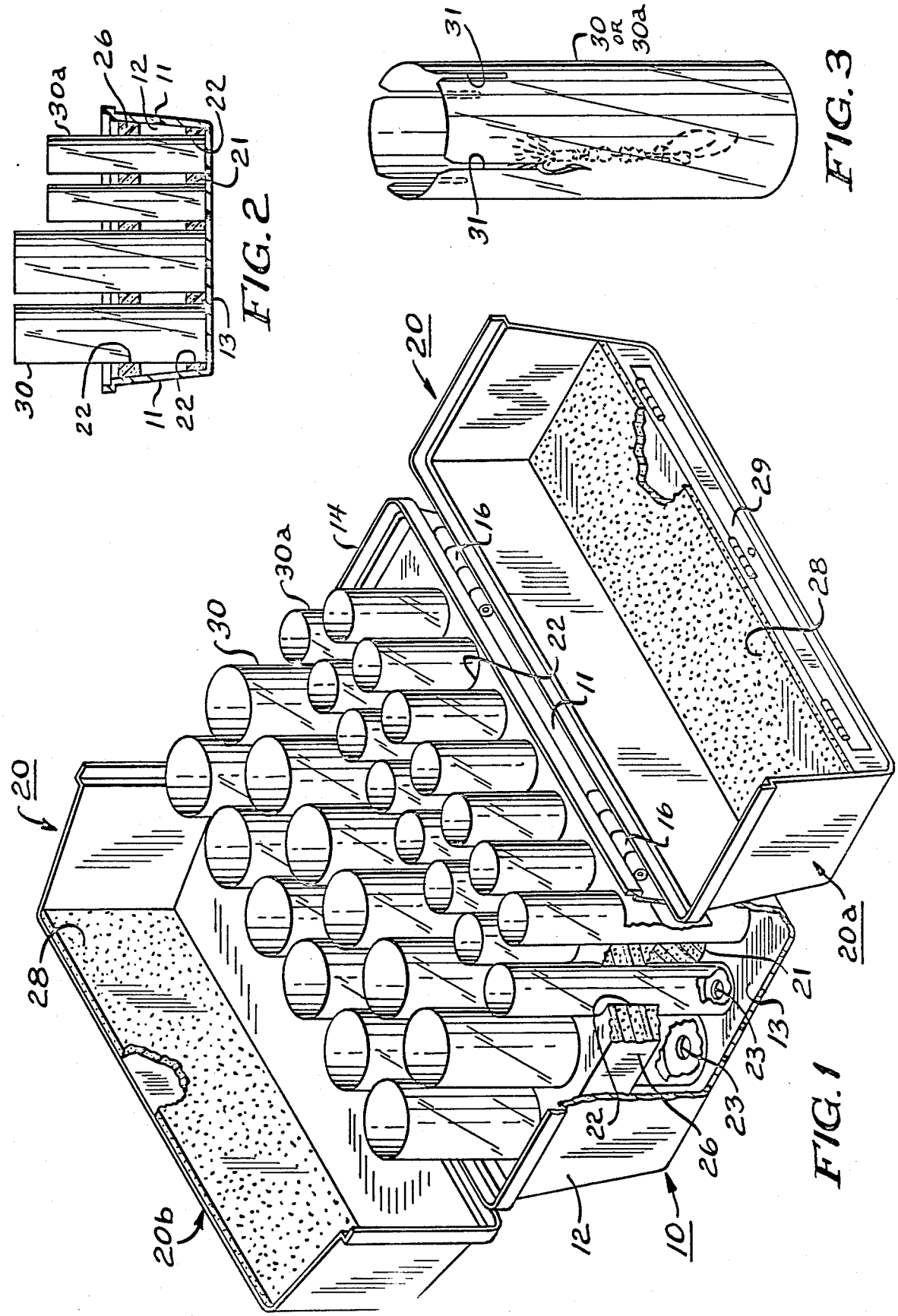

FISHING TACKLE BOX WITH VERTICAL STORAGE COMPARTMENTS

BACKGROUND OF THE INVENTION

This invention relates in general to fishing tackle boxes and, in particular, to a fishing tackle box for storing artificial lures.

More specifically, but without restriction to the particular embodiment and/or use which is shown and described for purposes of illustration, this invention relates to a fishing tackle box which presents artificial lures in a manner such that the lures are visible at all times while stored in a manner to prevent the lure hooks from becoming tangled with each other or with the hooks of other lures.

When fishing with artificial lures, fishermen utilize a number of different lures which may include lures of the same configuration, but different colors and/or different sizes. These lures are generally carried in a fishing tackle box which enables the fisherman to carry a wide variety of lures differing in type, size and color. These lures are generally carried in a tackle box which includes a plurality of compartments formed in a plurality of horizontally disposed trays into which one or more lure is placed to store the lures and present them for use. While fishing tackle boxes having such horizontally disposed storage compartments allow for the lures to be readily seen or displayed to facilitate locating a particular lure, such tackle boxes do have certain problems.

For example, such tackle boxes are bulky when opened to permit the lures in the trays to be displayed, and are generally capable of handling only a limited size lure. Larger lures, such as those used for muskie fishing, are generally too large to be stored in these horizontal compartments or trays. Therefore, such large lures must be kept in the container in which they are purchased, if possible, or kept in the base or container portion of the tackle box where the lures can become damaged, entangled with other items in the tackle box, or themselves. Storage in this latter manner results in the barbs of the lure hooks becoming bent, or dulled, which can result in lost fish. In addition, storing large lures in a horizontal position takes up a lot of space in the base of the tackle box, resulting in only a few lures being capable of being so stored. A further problem that occurs with such tackle boxes is that the hooks on the lures can move relative to the lure body, and in many instances these treble hooks attached to the lures become entangled with each other even when only a single lure is carried within a tray compartment. When two or more small lures are carried within the same tray compartment, it can be anticipated that the lure hooks will become entangled.

In order to overcome these problems associated with fishing tackle boxes of the type previously described, fishing tackle boxes have been designed which include a plurality of vertically disposed compartments or tubes. A fishing lure may be suspended within these compartments by positioning the bent portion of the lure hook over the upper end of the tube, with the fishing lure being suspended downwardly in the tube. Such tubes may be made from plastic, and the lid of the tackle box is designed such that the lures cannot fall from the compartments or tubes in the event the tackle box is tipped over. Prior art patents disclosing such fishing tackle boxes with vertically oriented storage compartments are disclosed in U.S. Pat. Nos. 3,350,810 and 4,589,546.

While tackle boxes such as disclosed in these patents overcome some of the problems associated with those tackle boxes having horizontally oriented display trays, such tackle boxes having vertically oriented storage compartments do not permit the lures to be displayed in a manner permitting a fisherman to readily determine what lures are available for use. Because of the manner in which the lures are contained within the tackle box, a fisherman cannot readily determine what lure is contained within the storage compartment or tube especially under low lighting conditions, generally encountered during the best fishing times, without individually removing each of the lures until a particular lure has been located.

The present invention overcomes both the problems associated with fishing tackle boxes having horizontally disposed compartments or trays, and those having vertically disposed compartments or tubes.

SUMMARY OF THE INVENTION

It is, therefore, an object of this invention to improve fishing tackle boxes.

Another object of this invention is to retain fishing lures in a manner which minimizes entanglement of the hooks attached to such lures.

A further object of this invention is to accommodate various size lures, including large lures, in a space-saving efficient manner.

Still another object of this invention is to display the lures contained within the fishing tackle box in a manner to facilitate ease of selection.

Yet another object of this invention is to provide a fishing tackle box for containing a number of various size lures displayed in a convenient manner for selection and which ensures that the lures will not become entangled if the tackle box is tipped over when closed, and which provides air circulation to facilitate drying of the lures. The tackle box will also float in the event the tackle box falls into the water.

These and other objects are attained in accordance with the present invention wherein there is provided a fishing tackle box having a plurality of vertically disposed storage compartments or tubes for containing various size fishing lures. The vertically disposed tubes are formed from transparent plastic and positioned in the tackle box with a portion thereof extending upwardly from the base portion of the tackle box to permit the lures carried within the vertically disposed storage compartments or tubes to be readily seen for facilitating lure selection.

DESCRIPTION OF THE DRAWINGS

Further objects of the invention, together with additional features contributing thereto and advantages accruing therefrom will be apparent from the following description of a preferred embodiment of the invention which is shown in the accompanying drawing with like reference numerals indicating corresponding parts throughout, wherein:

FIG. 1 is a perspective view of a fishing tackle box constructed in accordance with the present invention and having a plurality of vertically disposed transparent tubes for storing and displaying various size fishing lures;

FIG. 2 is a reduced cross-sectional view of a portion of the tackle box illustrated in FIG. 1 to better show the orientation of the display tubes and flotation material positioned within the fishing tackle box base portion; and FIG. 3 is a perspective view of one of the vertically disposed display tubes to illustrate the manner in which a fishing lure can be contained and displayed therein.

DESCRIPTION OF A PREFERRED EMBODIMENT

Referring now to FIG. 1, there is shown a fishing tackle box constructed in accordance with the present invention. The tackle box includes a container or base portion 10 having two side walls 11, two end walls 12 and a bottom panel 13. The bottom panel 13 is formed with a plurality of holes 23 therethrough which are formed to be positioned within the interior of each one of a plurality of vertically disposed display tubes 30, so that water dripping from the lures can pass out from the tackle box and air can circulate through to dry the lure. The container portion 10 has a lip 14 formed about the opening defined by the walls 11 and 12 which functions to strengthen this portion of the container 10 and to engage with a top or closure portion 20 to be hereinafter described in detail.

The top or closure portion 20 is formed, preferably, as two halves 20a and 20b with each of the halves being joined to one of the side walls 11 by a hinge connection 16 which permits the closure or cover portions 20a and 20b to be pivoted between an open or display position, such as illustrated by 20a, and a closed position (not illustrated).

As best illustrated in FIGS. 1 and 2, a layer or panel 21 of flotation material, such as an expanded rigid polystyrene plastic, is positioned at the bottom of the container portion 10 against the inner surface of the bottom panel 13, and has holes 22 formed therein which correspond to the size of vertically disposed display tubes 30. The display tubes 30 are secured in the holes formed in the flotation material, and extend upwardly therefrom. A second or upper band or panel of flotation material 26 is positioned within the container portion 10 of the tackle box just beneath the lip portion 14 formed about the open peripheral edge thereof. This second band of flotation material is also formed with a plurality of holes 22 therein through which the vertically disposed plastic display tubes 30 are passed. In this manner, the vertically disposed plastic display tubes 30 are oriented in a proper position, and held in this manner between the two flotation material panels 21 and 22. These flotation panels, preferably, are secured to the inner surfaces of the side walls 11, end walls 12 and/or the bottom panel 13. The flotation material, however, does not have to he secured in this manner, and if the tubes are secured in the holes formed in the flotation material without the flotation material being secured to the container portion 10, the entire tube display assembly may be lifted from the container portion, if desired.

As illustrated in FIG. 3, the vertically disposed display tubes 30 are preferably made from a transparent plastic material which permits the fishing lures positioned therein to be seen through the material from which the plastic display tubes are formed. A series of slots 31 may be formed in the upper end of the vertically disposed display tubes 30 to permit a hook from a fishing lure to be positioned in the slot 31 to retain the lure in a proper orientation. In this manner, also, more than one lure can be contained in an individual display tube 30 by positioning the lure in the tube with a hook engaging one of the slots 31.

The slots 31 are preferably formed of different depths to minimize the possibility of hooks on adjacent lures from becoming entangled and to accommodate lures of various lengths. Although it is not necessary for the vertically disposed display tubes to have slots 31 formed therein, the provision of such slots does facilitate the proper positioning of the lures positioned within the tubes.

As best seen in FIGS. 1 and 2, the vertically disposed display tubes 30 are positioned within the tackle box such that a major portion of the tube is positioned above the uppermost flotation material panel 26. In this manner, owing to the transparency of the tubes 30, a fishing lure positioned therein can be readily seen through the tube by a fisherman. Such display permits the fisherman to readily change lures even under low light conditions, because of the transparent nature of the material from which the vertically disposed display tubes 30 are formed. Preferably, such material is a clear plastic which will not react with the material from which the lures are formed, and will thereby provide a ready display of the lure contained within the tube.

The height to which the vertical tubes 30 extend is preferably just short of the distance which the cover portions 20a and 20b extend above the container portion 10 of the tackle box. In this manner, the close proximity of the inner surface of the top of the cover or lid portion 20a and 20b will hold the lures within the tackle box in the event the tackle box is overturned. A layer of resilient material such as foam or rubber 28 may be applied to the inner surface of the cover portions to facilitate closing of the open end of the vertical display tubes 30. The cover portion 20a can include an inner portion of a lesser height than 20b which is positioned adjacent shorter tubes 30a as illustrated in FIGS. 1 and 2, while still performing the retaining function. This portion of the cover 20a can be utilized to function as a separate storage compartment 29 for such things as leaders which would be attached between the lure and the fishing line.

While the invention has been described in the specification and illustrated in the drawings with reference to a preferred embodiment, it will be understood by those skilled in the art that various changes may be made and equivalents may be substituted for elements of the invention without departing from the scope of the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

I claim:

1. A fishing tackle box for storing and displaying artificial fishing lures including a pair of sidewalls, a pair of end walls and a bottom panel, said sidewalls, end walls and bottom panel being joined together forming a container with an open top, cover means for closing said open container comprising at least one sidewall, a pair of end walls and a top wall, said cover means having said sidewall pivotally connected to a sidewall of said container for pivoting said cover means between a position wherein said cover means closes said container and a position wherein said container is open, a plurality of open-ended transparent display tube means disposed vertically relative to said bottom panel and extending upwardly therefrom, support means operatively connected to said plurality of vertically disposed transparent display tube means for maintaining said display tube means in a vertical position, said display tube means extending above said support means and said container walls to display fishing lures carried within said display tube means, and at least some of said display tube means extending upwardly from said support means a distance such that the open end thereof is positioned adjacent to an inner surface of said cover means top wall when said cover means is in a closed position.

2. The fishing tackle box defined by claim 1 wherein said support means comprises flotation material.

3. The fishing tackle box defined by claim 1 wherein said display tube means are formed with slots extending downwardly from an upper open end for receiving the hook of a fishing lure.

4. The fishing tackle box defined by claim 1 wherein said cover is formed as two portions, each one of said two portions having a sidewall pivotally connected to a sidewall of said container for pivotal movement of said two portions toward each other to close said container and away from each other to open said container.

5. The fishing tackle box defined by claim 1 wherein said top wall of said cover means includes a layer of resilient material on the interior surface thereof for closing the open end of said display tube means when said cover means closes said container.

6. The fishing tackle box of claim 1 wherein said cover means for closing said open container comprises two sidewalls, a pair of end walls joined to each one of said sidewalls and a top wall joined to each pair of said end walls and each one of said sidewalls.

7. A fishing tackle box for storing and displaying artificial fishing lures including a pair of sidewalls, a pair of end walls and a bottom panel, said sidewalls, end walls and bottom panel being joined together forming a container with an open top, cover means for closing said open container comprising at least one sidewall, a pair of end walls and a top wall, said cover means having said sidewall pivotally connected to a sidewall of said container for pivoting said cover means between a position wherein said cover means closes said container and a position wherein said container is open, a plurality of open-ended transparent display tube means disposed vertically relative to said bottom panel and extending upwardly therefrom, support means operatively connected to said plurality of vertically disposed transparent display tube means for maintaining said display tube means in a vertical position, said support means comprising a first panel of flotation material positioned on an interior surface of said bottom panel of said container, and a second panel of flotation material positioned adjacent to the open top of said container with said display tube means extending through openings formed in said first and second panels of flotation material, and said display tube means extending above said support means and said container walls to display fishing lures carried within said display tube means.

8. The fishing tackle box defined by claim 7 wherein said bottom panel of said container has holes formed therethrough which communicate with the interior of said display tube means.

9. A fishing tackle box for storing and displaying artificial fishing lures including a pair of sidewalls, a pair of end walls and a bottom panel, said sidewalls, end walls and bottom panel being joined together forming a container with an open top, cover means for closing said open container comprising two portions, each one of said two portions having a sidewall pivotally connected to a sidewall of said container for pivotal movement of said two portions toward each other to close said container and away from each other to open said container, a plurality of open-ended transparent display tube means disposed vertically relative to said bottom panel and extending upwardly therefrom, said plurality of open-ended transparent display tube means comprising a first and a second set of transparent display tubes positioned in parallel rows, said first set of display tubes extending upwardly from said bottom panel to a position such that the open end thereof is adjacent to the inner surface of one portion of the top cover, and said second set of display tubes extending upwardly from said bottom panel to a position such that the open end thereof is adjacent to the inner surface of the other portion of the top cover, support means operatively connected to said plurality of vertically disposed transparent display tube means for maintaining said display tube means in a vertical position, and said display tube means extending above said support means and said container walls to display fishing lures carried within said display tube means.

10. The fishing tackle box defined by claim 9 wherein one of said top cover portions includes a storage chamber formed by a wall extending parallel to the upper surface of said cover.

* * * * *